United States Patent
Vaessen et al.

(10) Patent No.: US 9,532,670 B2
(45) Date of Patent: Jan. 3, 2017

(54) WALL DECORATION ASSEMBLY, KIT FOR MAKING A WALL DECORATION ASSEMBLY AND METHOD FOR HANGING SUCH ASSEMBLY

(71) Applicant: IXXI Concepts Group B.V., 's-Hertogenbosch (NL)

(72) Inventors: Roel Antonius Wilhelmus Vaessen, 's-Hertogenbosch (NL); Johannes Henricus Maria Sloot, 's-Hertogenbosch (NL); Paulien Francisca Berendsen, 's-Hertogenbosch (NL)

(73) Assignee: IXXI CONCEPTS GROUP B.V., 's-Hertongenbosch (NL)

( * ) Notice: Subject to any disclaimer, the term of this patent is extended or adjusted under 35 U.S.C. 154(b) by 0 days.

(21) Appl. No.: 14/840,532

(22) Filed: Aug. 31, 2015

(65) Prior Publication Data

US 2016/0058213 A1    Mar. 3, 2016

(30) Foreign Application Priority Data

Sep. 2, 2014  (NL) ...................................... 2013401

(51) Int. Cl.
*A47G 1/16*       (2006.01)
*A47G 1/17*       (2006.01)

(52) U.S. Cl.
CPC ............ *A47G 1/1686* (2013.01); *A47G 1/1606* (2013.01); *A47G 1/17* (2013.01)

(58) Field of Classification Search
CPC ...... A47G 1/1686; A47G 1/1606; A47G 1/17; B44C 5/02

USPC .............. 211/87.01, 45, 48; 40/605, 607.15, 40/607.13, 606.17, 730; 24/453; 248/496
See application file for complete search history.

(56) References Cited

U.S. PATENT DOCUMENTS

| | | | | | |
|---|---|---|---|---|---|
| 3,109,212 | A | * | 11/1963 | Emery .................. | B65D 63/14 24/16 PB |
| 3,471,959 | A | * | 10/1969 | Seger .................. | G09F 15/0006 40/605 |
| 3,642,144 | A | * | 2/1972 | Brooks .................. | A47F 7/163 211/45 |
| 3,965,583 | A | * | 6/1976 | Price ...................... | A47F 7/163 211/45 |
| 4,017,989 | A | * | 4/1977 | Murray ..................... | G09F 1/12 40/605 |
| 4,190,157 | A | * | 2/1980 | Chatham .................. | A47G 1/17 206/477 |
| 4,497,125 | A | * | 2/1985 | Hutchinson ............... | G09F 1/10 211/40 |
| 4,510,707 | A | * | 4/1985 | Girard .................... | A47G 1/065 40/27.5 |
| 4,673,152 | A | * | 6/1987 | Brown .................... | A47G 1/215 211/40 |

(Continued)

FOREIGN PATENT DOCUMENTS

| | | |
|---|---|---|
| CH | 706 500 A2 | 11/2013 |
| DE | 20 2007 010222 U1 | 10/2007 |
| WO | WO 97/22285 | 6/1997 |

*Primary Examiner* — Stanton L Krycinski
(74) *Attorney, Agent, or Firm* — Knobbe, Martens, Olson & Bear, LLP

(57) ABSTRACT

A kit for making a wall decoration assembly is described. The kit includes a suspension system and one or more wall decorations. A method for making and hanging the wall decoration assembly is also described.

15 Claims, 9 Drawing Sheets

(56) References Cited

U.S. PATENT DOCUMENTS

| | | | | |
|---|---|---|---|---|
| 5,351,813 A * | 10/1994 | Golovan | ................ | A45C 11/18 |
| | | | | 206/449 |
| 5,429,700 A * | 7/1995 | Hudson | ............... | B32B 38/0012 |
| | | | | 156/253 |
| 5,437,428 A * | 8/1995 | Mirza | ...................... | A47G 1/17 |
| | | | | 24/683 |
| 5,613,874 A * | 3/1997 | Orlando | ............... | H01R 13/465 |
| | | | | 40/607.13 |
| 5,706,559 A * | 1/1998 | Oliver | .................. | F16B 21/088 |
| | | | | 24/115 M |
| 5,761,839 A * | 6/1998 | Heikkila | ............. | G09F 15/0012 |
| | | | | 40/730 |
| 6,054,968 A * | 4/2000 | De Matteo | .......... | G09F 15/0068 |
| | | | | 312/7.2 |
| 6,405,983 B1 * | 6/2002 | Goj | ......................... | A47G 1/17 |
| | | | | 248/205.1 |
| 6,439,535 B1 * | 8/2002 | Mirza | ...................... | A47G 1/06 |
| | | | | 24/683 |
| 7,059,482 B2 * | 6/2006 | Reid | ....................... | A47F 7/163 |
| | | | | 211/118 |
| D736,858 S * | 8/2015 | McPhillips | .................... | D20/43 |
| 9,254,051 B2 * | 2/2016 | McPhillips | ............. | G09F 15/00 |
| 9,311,836 B1 * | 4/2016 | van der Walde | ... | G09F 15/0006 |

\* cited by examiner

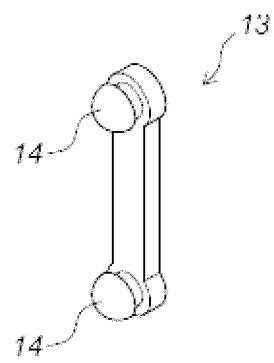
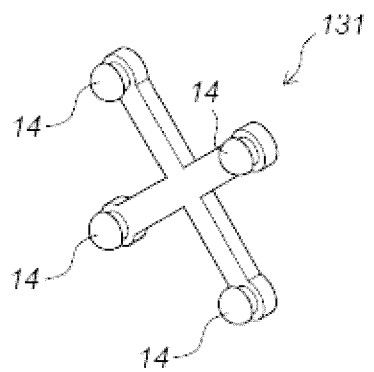
Fig. 4A  Fig. 4B
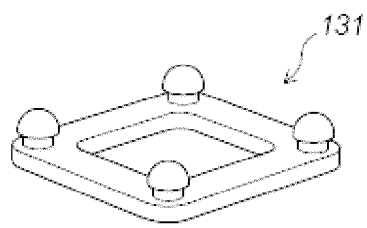
Fig. 4C
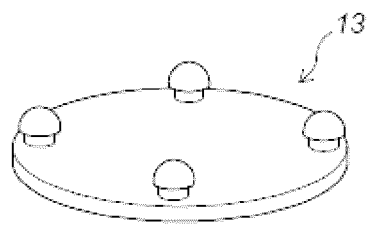
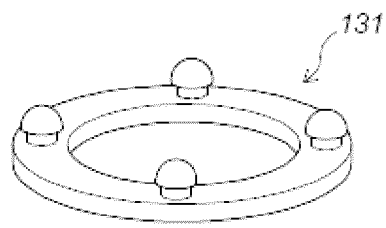
Fig. 4D  Fig. 4E
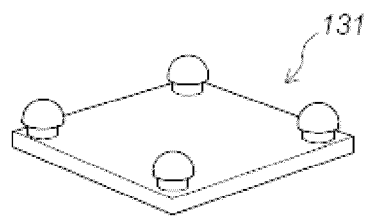
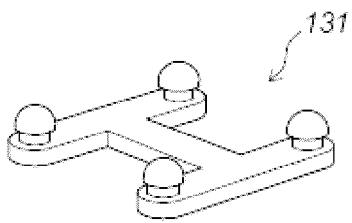
Fig. 4F  Fig. 4G

WALL DECORATION ASSEMBLY, KIT FOR MAKING A WALL DECORATION ASSEMBLY AND METHOD FOR HANGING SUCH ASSEMBLY

TECHNICAL FIELD

The invention pertains to the technical field of wall decorations, more particularly to wall decoration assembly as well as a kit to enable the creation of a wall decoration.

BACKGROUND

People have always paid a lot of attention to their interior and to wall decorations. Hanging wall decorations such as posters, pictures or prints to a wall can be difficult and tricky, especially if one wants to perfectly align the wall decoration with the wall.

Moreover, it has become practice for most people to frequently change or alter their interior or interior elements, in order to create a new look and feel. Concepts such as Ikea which focus on affordable and flexible furniture have become very successful riding this wave.

To date, systems exist that allow alignment and fixation of wall decorations to a wall. Some of them even allow re-use of the system, allowing taking the decoration down, and to rehang it somewhere else or replace it with another decoration. However, most of these known systems are not user-friendly, or are restricted in their amount of re-use.

There remains a need in the art for an improved suspension system for wall decorations, which allows multiple re-use and repositioning of the system.

There is also a need in the art for wall decorations which can be easily aligned to a wall, which can be easily re-used and are not restricted to a specific size, and which can be dynamically altered.

The present invention aims to resolve at least some of the problems mentioned above.

The invention thereto aims to provide a wall decoration which can be easily hung and aligned to a wall in a removable manner, and which allows dynamic use of the wall decoration.

SUMMARY OF THE INVENTION

The present invention provides a kit for making a wall decoration assembly according to claim 1, a wall decoration assembly according to claim 10 and a method for hanging a wall decoration assembly to a wall according to claim 17.

The invention comprises the following embodiments. It should be understood that these embodiments are not to be seen as limiting to the invention.

1. A kit for making a wall decoration assembly, said kit comprises:
   a suspension system; and
   one or more wall decorations, said wall decorations are provided with two or more perforations located at or nearby an edge of said wall decoration, said wall decorations may be hung to a wall by means of said suspension system, whereby said suspension system comprises:
   a longitudinal strip, said longitudinal strip is provided with two or more perforations; and
   one or more adhesive elements, characterized in that said suspension system further comprises one or more connecting elements, whereby said connecting element is suitable for receiving said one or more adhesive elements on the rear of said element, whereby said connecting element comprises at least one protrusion on the front of said element, connectable to a perforation of said strip and/or of said wall decoration.

2. Kit according to embodiment 1, characterized in that said connecting element is provided with two protrusions.

3. Kit according to any one of the previous embodiments, characterized in that said connecting element is provided with a notch along a longitudinal axis of said element, said notch allows the division of said element into two sub-elements.

4. Kit according to embodiment 3, characterized in that each said sub-element is provided with a protrusion.

5. Kit according to any one of the previous embodiments, characterized in that said protrusion is a knob or knob-like.

6. Kit according to any one of the previous embodiments, characterized in that said wall decoration is rectangular and has four perforations, whereby each corner of said wall decoration comprises one perforation.

7. Kit according to any one of the previous embodiments, characterized in that said kit comprises at least two wall decorations, and joining elements for interconnecting said wall decorations.

8. Kit according to embodiment 7, characterized in that said joining elements are provided with at least two protrusions on their surface, suitable for engaging with said perforations on said wall decorations.

9. Kit according to embodiments 7 to 9, characterized in that said joining element is linear, cross-shaped, round, H-shaped, Z-shaped or U-shaped.

10. Kit according to any one of the previous embodiments, characterized in that said strip perforations are located along a longitudinal axis of the strip and whereby said strip comprises at least one perforation at each of its margins, and optionally further perforations, whereby said further perforations are grouped in pairs and distributed over regular distances along the longitudinal axes of said strip.

11. Kit according to embodiment 10, characterized in that the maximal distance between two adjacent strip perforations is equal to the distance between two perforations present on one edge of said wall decoration.

12. Kit according to any one of the previous embodiments, characterized in that said adhesive elements are double-sided adhesive elements.

13. A wall decoration assembly comprising a suspension system and one or more wall decorations, said wall decorations are provided with at least two perforations located at or nearby an edge of said wall decoration, said wall decoration assembly is hung aligned to a wall by means of said suspension system, whereby said suspension system comprises a longitudinal strip, said longitudinal strip is provided with at least two perforations characterized in that said suspension system further comprises at least two connecting elements, removable coupled to a wall by adhesive means and whereby said elements are detachable connected to said strip and/or one or more wall decorations by means of one or more protrusions, connected to one or more perforations present on said strip and/or on said wall decoration.

14. Wall decoration assembly according to embodiment 13, characterized in that wall decoration assembly comprises two or more wall decorations, removable interconnected with each other by means of joining elements.

15. Wall decoration assembly according to embodiment 14, characterized in that said joining elements are provided with at least two protrusions, removable engaged to said perforations on said wall decorations.

16. Wall decoration assembly according to any one of the embodiments 13 to 15, characterized in that said wall decoration is rectangular and has four perforations, whereby each corner of said wall decoration comprises one perforation.

17. Wall decoration assembly according to the previous embodiments, characterized in that said joining element is linear, cross-shaped, round, H-shaped, Z-shaped or U-shaped.

18. Wall decoration assembly according to any one of the previous embodiments, characterized in that each protrusion on a joining element is connected to a perforation of a different wall decoration.

19. Wall decoration assembly according to embodiments 14 to 18, characterized in that said interconnected wall decorations form one large wall decoration.

20. Wall decoration assembly according to any one of the previous embodiments, characterized in that said wall decoration comprises a print.

21. Method for hanging a wall decoration assembly to a wall, comprising providing a longitudinal strip provided with at least two perforations removable attached to a wall by means of one or more adhesive elements and connecting one or more wall decorations to said strip via perforations located at or nearby an edge of said wall decoration characterized in that said strip and said one or more wall decorations are connected by means of protrusions on one or more connecting elements placed to a desired location on a wall or the like by means of double sided tape.

22. Method according to embodiment 21, comprising removable interconnecting at least two wall decorations with each other by means of joining elements comprising at least two protrusions, said joining elements are connected to said perforations on said wall decorations and/or on said strip.

23. Method according to any one of the previous embodiments, characterized in that said wall decoration assembly is purchased online or over the counter.

24. Method according to embodiment 23, characterized in that said wall decoration comprises a print, said print may be chosen from an online database or uploaded by a customer.

25. Method according to embodiment 24, characterized in that said print is divided in one or more wall decorations, whereby said each wall decoration is rectangular.

26. Connecting element as suspension aid for a wall decoration, characterized in that said connecting element is provided with two protrusions suitable for connecting with a perforation on a strip and/or wall decoration, said protrusions are placed along a lateral axis of said element, whereby said protrusions are separated by a notch, allowing the division of said element in sub-elements.

27. Connecting element according to embodiment 26, characterized in that a first sub-element is smaller than a second sub-element.

DESCRIPTION OF FIGURES

FIGS. 4A-4G show various embodiments of a joining element according to the current invention.

DETAILED DESCRIPTION OF THE INVENTION

Figure 1:
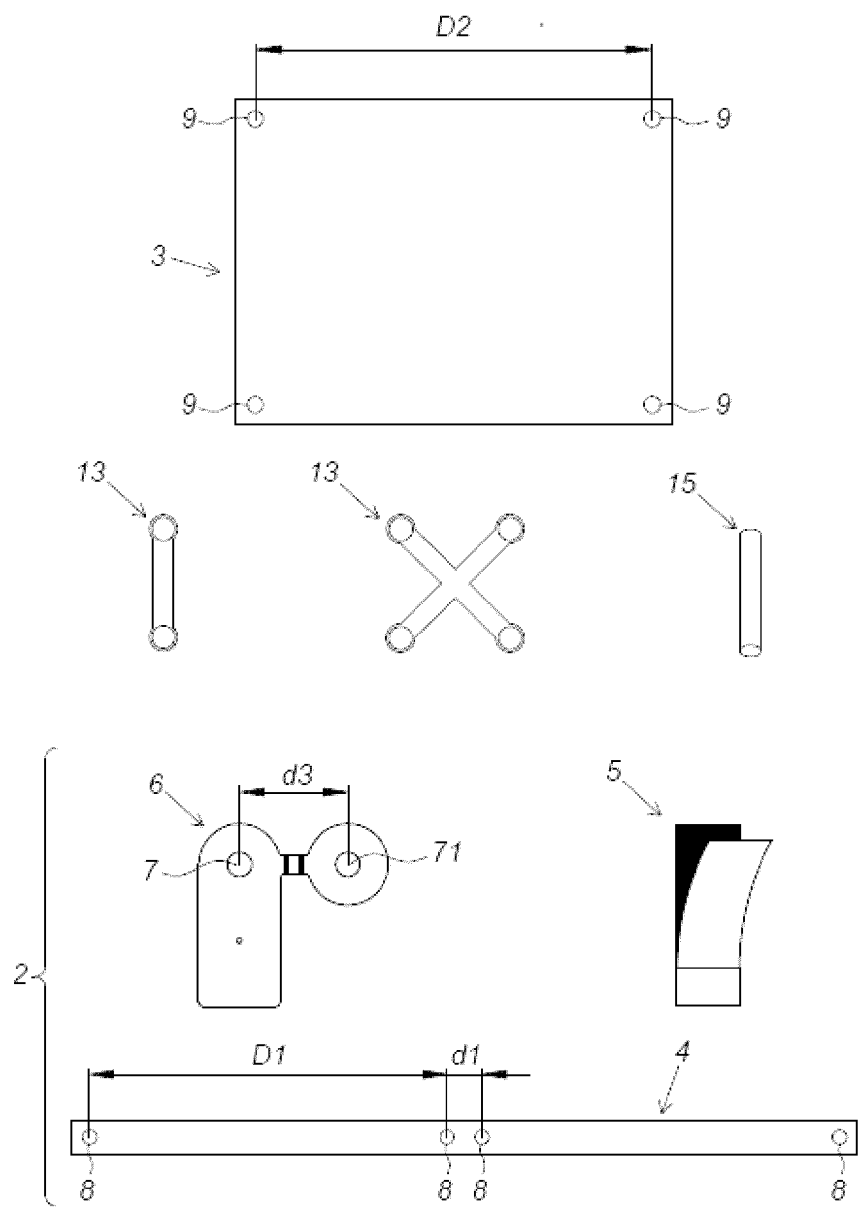
FIG. 1 shows a kit according to an embodiment of the current invention.

The present invention concerns a kit for making a wall decoration assembly. The resulting wall decoration assembly is removable attachable to a wall and modular. The wall decorations can be aligned to a wall by means of an ingenious suspension system. The wall decoration assembly can be easily attached to and removed from a wall, and hung elsewhere if desired. The wall decorations are also interchangeable by other decorations, providing great flexibility.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise," "comprising," and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The recitation of numerical ranges by endpoints includes all numbers and fractions subsumed within that range, as well as the recited endpoints.

The expression "% by weight" (weight percent), here and throughout the description unless otherwise defined, refers to the relative weight of the respective component based on the overall weight of the formulation.

In a first aspect, the current invention comprises a kit for making a wall decoration assembly. By preference, such a kit comprises a suspension system and one or more wall decorations, which can be aligned to a wall or the like by means of said suspension system. In a preferred embodiment, said wall decorations are provided with two or more perforations located at or nearby an edge of said wall decoration.

In an embodiment, said suspension system comprises the following components:
- a longitudinal strip, which is provided with two or more perforations; and
- one or more adhesive elements.

The longitudinal strip is by preference made from a polymer, such as a plastic. Said strip has preferably some flexibility. In one embodiment, said strip is transparent. In another embodiment, said strip is opaque and coloured. In an embodiment, said strip is made from a polypropylene foil.

The adhesive elements may be all sort of suitable adhesive elements known in the art and usable with the current invention. In a preferred embodiment, said adhesive element is a double-sided tape. In a further, more preferred embodiment, said double-sided tape is reusable, and does not leave any traces on the surface when being used. In an embodiment, said adhesive element is a PSA tape.

By preference, the suspension system further comprises one or more connecting elements, whereby each connecting element is suitable for receiving said one or more adhesive elements on the rear of said element, whereby said connecting element comprises at least one protrusion on the front of said element, connectable to a perforation of said strip and/or of said wall decoration.

By preference, all connections are temporary and can be made undone and re-made when required or desired.

The current invention has as advantage that the wall decoration(s) can be easily hung to a wall, in a removable and modular manner. The use of the connecting elements provided with the adhesive elements allows the simultaneous adherence of the linear strip and the wall decoration(s).

As such, the user is not restricted to any format, but can instead regularly change the look of the wall decoration assembly or hang it somewhere else.

The connecting element is provided with one or more protrusions which can connect to a perforation on the strip and/or on the wall decoration. The protrusion and perforation act as a key-lock system, whereby the protrusion is thus designed to fit tightly but removable fit the perforation on the strip and/or the wall decoration.

Said protrusion can have any form in the art if suitable to connect with a perforation. Said protrusion can be round, such as a knob or knob-like or elliptical. Said protrusion can be square or rectangular. Preferably, said protrusion is, at its base at the level of the body of the connecting element provided with a rim. Said diameter at the level of the rim is smaller than the largest diameter of said protrusion or diameter of said perforation. This allows good connection of the protrusion to the strip or wall decoration via the perforation.

In a further preferred embodiment, the connecting element is provided with two protrusions. These two protrusions are by preference located at the top-level of the connecting element. The protrusions are by preference placed along a lateral axis of said element, on the same height.

In a further embodiment, said connecting element is provided with a notch along a longitudinal axis of said element, said notch allows the division of said element into two sub-elements. By preference, each sub-element is provided with a protrusion.

In a further preferred embodiment, said sub-elements are of a different size and form.

Division of the element in sub-elements enlarges the functionality of the element. Division allows use of the element at the edges of the strip, which may otherwise require a separately provided element in the kit. A second sub-element may be used to connect to a perforation at the bottom of the lowest wall decoration (outer left and right side), providing additional weight the wall decoration, in order to optimize alignment with the wall. By allowing division, the multi-functionality of the element is positively influenced, thereby omitting the requirement of additional components in the kit, which would have an impact on the sale price (because of the requirement of additional production moulds).

In a further embodiment, said connecting element may be provided by a puncture, for allowing a pushpin to be used in conjunction with said element.

The connecting element allows suspension of a wall decoration to a wall. Said wall decoration is preferably rectangular or square and has four perforations, whereby each corner is provided with one perforation.

By preference, said wall decoration is produced from paper, cardboard, plastic, a polymeric substrate such as a polyester or tissue. By preference, said wall decoration comprises synthetic paper. Said material of the wall paper can be printed.

Said wall decoration comprises a print, such as a picture, a painting, a drawing, a photograph, etc. Said nature of the print may be chosen from an existing database or provided by a client. In a further embodiment said wall decoration is provided with a print at both sides. This increases the multi-functionality of the kit.

The kit according to the current invention may comprise one wall decoration. Dimensions of the wall decoration can be freely chosen. In a further, more preferred embodiment, the kit may comprise two or more wall decorations, such as 2, 3, 4, 5, etc. The wall decorations may have the same dimension, or different dimensions, depending on the wall decoration assembly that is envisioned.

When comprising more than one wall decoration, said kit will comprise joining elements for interconnecting said wall decorations. These joining elements are by preference produced from a polymer. The joining elements are by preference provided with at least two protrusions on their surface, suitable for engaging with said perforations on said wall decorations. The protrusions on said joining elements are by preference similar in size and form as the protrusions on the connecting elements in the kit. Said protrusions may be round, elliptical, a knob or knob-like, rectangular or square. Said protrusion may at its base be provided with a rim, said diameter at the level of the rim is smaller than the largest diameter of said protrusion or diameter of said perforation. This allows good connection of the protrusion to wall decoration via the perforation.

In an embodiment, said joining element is linear, cross-shaped, round, H-shaped, Z-shaped or U-shaped. In a further embodiment, said joining element I provided with two or four protrusions. By preference, said protrusions are placed along a symmetric axis. In a further embodiment, said protrusions are present at the extremities or the corners of said element.

The symmetric position of the protrusions allows consistent and regular interconnection of the wall decorations towards one large modular wall decoration.

Said linking elements can be connected to the front or the back of the wall decorations, depending on the preference of the user. Aesthetically, connection to the back is preferred, since visibility of the elements is reduced to a minimum (limited to the protrusion).

A wall decoration will be removable connected to a strip aligned to a wall or the like by means of the connecting element according to the current invention. The connecting element is connectable to the strip by means of the protrusions present on the element, which can engage with one or more perforations on said strip.

In an embodiment, said strip perforations are located along a longitudinal axis of the strip. Preferably, said strip comprises at least one perforation at each of its margins, and optionally further perforations, whereby said further perforations are preferably grouped in pairs and distributed over regular distances along the longitudinal axes of said strip.

In a preferred embodiment, the paired perforations are thus designed to allow connection with the two protrusions present on the connecting element. For this, the distance between the paired perforations will be equal to the distance of the two protrusions on said connecting element.

Furthermore, the maximal distance between two adjacent strip perforations is equal to the distance between two perforations present on one edge of said wall decoration.

This perfectly matched positioning of protrusions and perforations on the different elements of the kits, allows the generation of a sophisticated yet easily mountable and modular wall decoration.

By preference, the maximal length of the connecting element will be larger than the width of the strip. As such, when connected to the strip and to the wall, the strip can be easily removed from the wall by the extended portion of the connecting element, not covered by an overlaying strip. This extended portion creates a 'lever', which allows the user to remove the strip from the wall in one fluent movement, thereby not leaving any trace of the adhesive element on the wall. This is a very big advantage in view known systems in the art, in which for instance the strip as such is adhered to a wall. Because of the minimal thickness of the strip, absence of a lever as described above makes it difficult to remove the strip and thus to re-use the system.

Optionally, said kit may be further provided with a manual, providing instructions to a customer, as well as with a ruler for enabling a user to correctly position the wall decoration assembly to a wall or the like. In a preferred embodiment, said manual and ruler are provided in one document which can serve both purposes.

The current invention equally relates to a wall decoration obtainable by the kit as described above.

In an embodiment, said wall decoration assembly comprises a suspension system and one or more wall decorations, whereby the wall decorations are provided with at least two perforations located at or nearby an edge of said wall decoration, said wall decoration assembly is hung aligned to a wall or the like by means of said suspension system, whereby said suspension system comprises a longitudinal strip, said longitudinal strip is provided with at least two perforations. In a further preferred embodiment, said suspension system further comprises at least two connecting elements, removable coupled to a wall by adhesive means and whereby said elements are detachable connected to said strip and/or one or more wall decorations by means of one or more protrusions, connected to one or more perforations of present on said strip and/or on said wall decoration.

By preference, the wall decoration assembly comprises one or more wall decorations, which eventually form one large wall decoration. If more than one wall decorations are used to form the wall decoration assembly, these decorations are joined by joining elements according to the current invention.

The current invention also relates to the connecting element as a suspension aid for a wall decoration. By preference, said connecting element is provided with two protrusions suitable for connecting with a perforation on a strip and/or wall decoration, said protrusions are placed along a lateral axis of said element, whereby said protrusions are separated by a notch, allowing the division of said element in sub-elements. When divided, a first sub-element will be preferably smaller than a second sub-element. As mentioned and further described in detail below, such division enlarges the functionality of the element.

In a final aspect, the current invention also relates to a method for hanging a wall decoration assembly to a wall. The methodology comprises several steps.

First, a longitudinal strip provided with at least two perforations is removable attached to a wall or the like (any other vertical structure) by means of one or more adhesive elements. These adhesive elements comprise by preference double-sided tape, which are adhered on the back of two or more connecting elements, and which are subsequently adhered to a wall or the like on a desired location. The connecting elements are provided with one or more protrusions on their front surface. The strip will be connected to the connecting elements by means of the protrusions on the element and the perforations on the strip.

Optionally, positioning of the strip may be accompanied by the temporarily adherence of a ruler to said wall or the like (present in the kit), which is hung perfectly to the wall by aid of a level.

Secondly, one or more wall decorations are (again removable) connected to said connecting elements via perforations located at or nearby an edge of said wall decoration.

In a further embodiment of the method, at least two wall decorations with each other will be removable joined together by means of joining elements comprising at least two protrusions, said joining elements are connected to said perforations on said wall decorations and/or on said strip. This joining of the various wall decorations can be done prior to the connection with the connecting elements, or afterwards, when the wall decorations or part of them are already connected to said connecting elements.

If necessary, said connecting element may be divided in two sub-elements by means of the notch present on said element. The two sub-elements may subsequently be used in a different functional manner. One sub-element may be provided with an adhesive element and attached to the wall, to serve as suspension aid for the strip and/or the wall decorations.

The second sub-element may for instance be used to connect to the perforation of the lowermost of the wall decoration, in order to provide a certain weight to the wall decoration, ensuring correct alignment to the wall. Secondly, connecting a connecting element to the lowermost perforations of said wall decoration also provides an aesthetic character to said wall decoration, ensuring visual uniformity of the wall decoration (all perforations are 'filled' with a protrusion).

In a preferred embodiment, said wall decoration assembly or kit is purchased online or over the counter. The print of said wall decoration may be chosen from an online database, a pre-printed collection or an upload by a customer (e.g. photographic material). One or more prints can be chosen, which will result in various wall decorations.

In a further embodiment, the wall decoration assembly may be customised according to the preferences of the customer. Dimensions of the wall decoration assembly and/or individual wall decorations, colour of the print, colour of the connecting/linking elements, material of the wall decoration, one-sided or double-sided print are one of the few variables that may be customised. The chosen print may enlarged to a desired size and sub-divided in a defined number of wall decorations, or the wall decorations may comprise different prints (a collage), or a chosen image may be transformed to a mosaic image hereby each wall decoration comprises a 'pixel' of the image. By preference, each wall decoration will be rectangular or square, but the exact dimensions may be chosen by the customer.

When purchased online, the customer will be able to indicate his or her preferences by means of an interactive software tool, which allows the customer to customise the wall decoration assembly according to his or her specific preferences.

The invention is further described by the following non-limiting examples which further illustrate the invention, and are not intended to, nor should they be interpreted to, limit the scope of the invention.

The present invention will be now described in more details, referring to figures that are not limitative.

FIGURE DESCRIPTION

FIG. 1 shows a possible embodiment of a kit according to the current invention for making a wall decoration assembly. The kit comprises a suspension system (2), at least one wall decoration (3) and optionally one or more types of joining elements (13). The suspension system (2) comprises of a longitudinal strip (4), connecting elements (6) and adhesive elements (5). The strip is provided with perforations (8) along a longitudinal axis of the strip (4). Each margin of the strip only requires one perforation (8) whereas the further perforations are grouped pairwise. The distance d1 between two paired strip perforations will be equal to the distance d3 of two protrusions (7, 71) present on a connecting element (6). The maximal distance D1 between two strip perforations (8) equals the maximal distance D2 between two perforations on the top side of a wall decoration (9). By perfectly adjusting all components of the kit, a simple yet sophisticated wall decoration assembly can be achieved.

The components of the kit are by preference packed in a box, such as a carton box, adapted for postage. The kit may further comprise a click aid (15) for aiding with the connection of the connecting and/or linking elements to one wall decoration assembly. Further enclosures in the kit may be a manual with use instructions and a ruler for ensuring correct suspension.

Figure 2A:
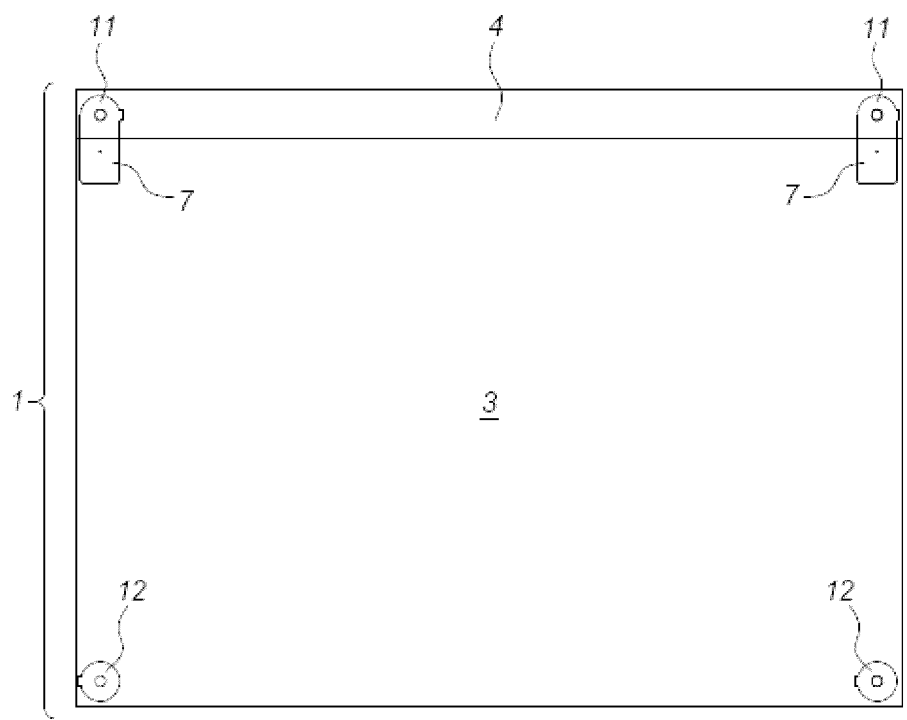
FIGS. 2A-2C show various embodiments of a wall decoration assembly according to the current invention.

FIG. 2 shows possible embodiments of the wall decoration assembly according to the current invention. FIG. 2A shows an embodiment wherein only one wall decoration (3) is used to come to a wall decoration assembly according to the current invention. The strip is provided with two perforations at its outer margins. Two connecting elements according to an embodiment of the current invention are needed as suspension aids for the strip and the wall decoration. The connecting elements will be subdivided by in two sub-elements (11, 12). Two sub-elements (11) connected to a strip (4) are adhered to a wall by means of an adhesive element (not visible). Connection between the strip (4) and the sub-elements (11) occurs via the protrusions (7) on the sub-elements (11). The wall decoration (3) is then connected to the protrusions (7) of the sub-elements (11) as well via perforations on the wall decoration (3), providing a wall decoration assembly (1). Second sub-elements (12) are provided to the lowermost wall perforations of the wall decoration (3), for aesthetic reason and to provide a certain weight to the wall decoration, allowing it to hang straight to the wall.

FIG. 3 shows a detailed view of possible embodiments of the connecting element (6) of the current invention. The elements have a flat back, in order to allow the adherence of an adhesive element (not shown).

Figure 3A:
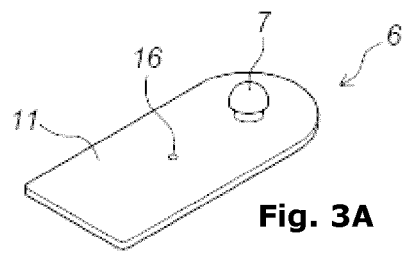
FIGS. 3A-3D show various embodiments of a connecting element according to the current invention.

FIG. 3A shows the most rudimentary form of the element (6) according to the current invention, with one protrusion.

Figure 3B:
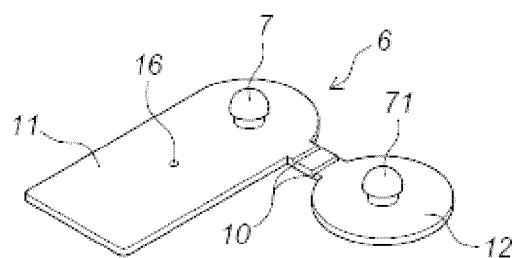
Figure 3C:
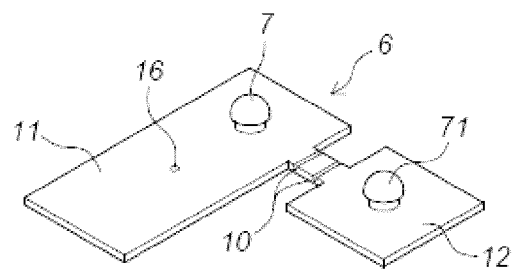
Figure 3D:
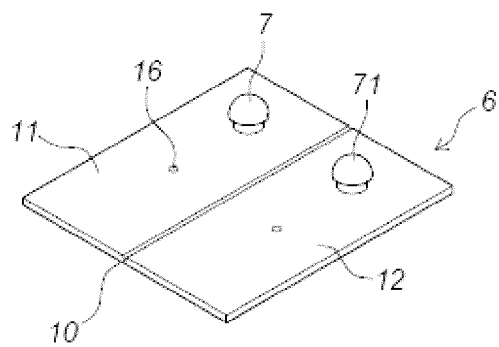
Figure 5A:
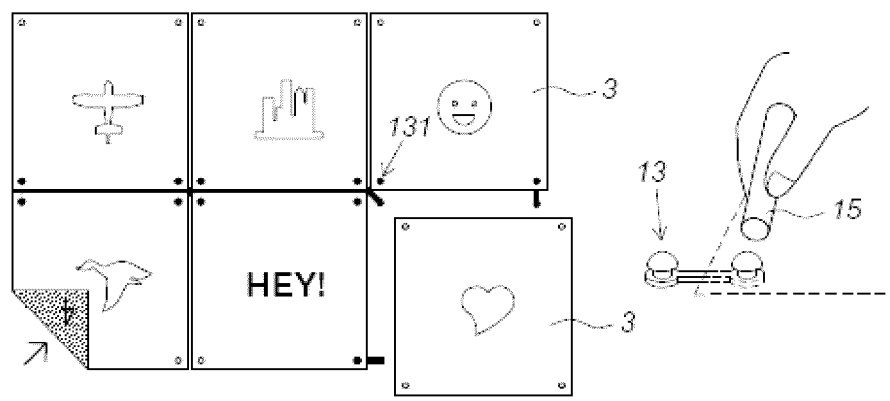
FIGS. 5A-5E show a method to hang a wall decoration to a wall according to an embodiment of the current invention.
Figure 5B:
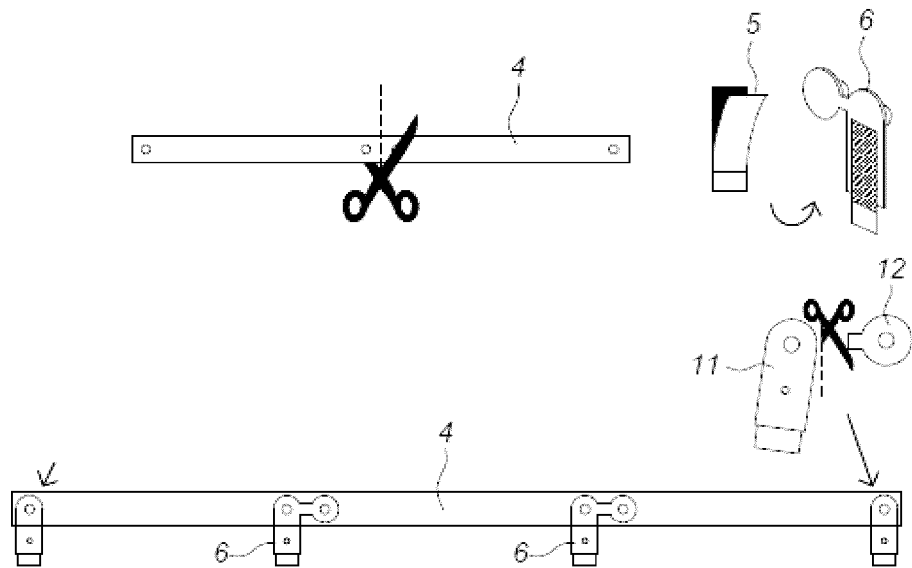
Figure 5C:
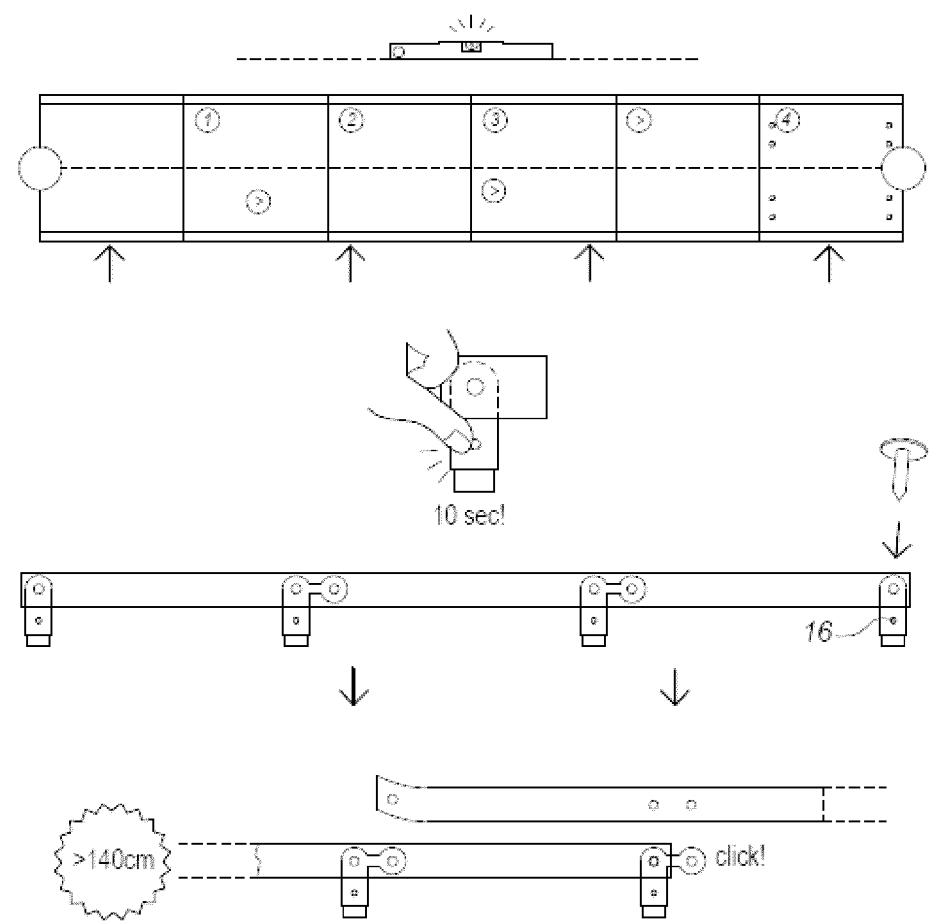
Figure 5D:
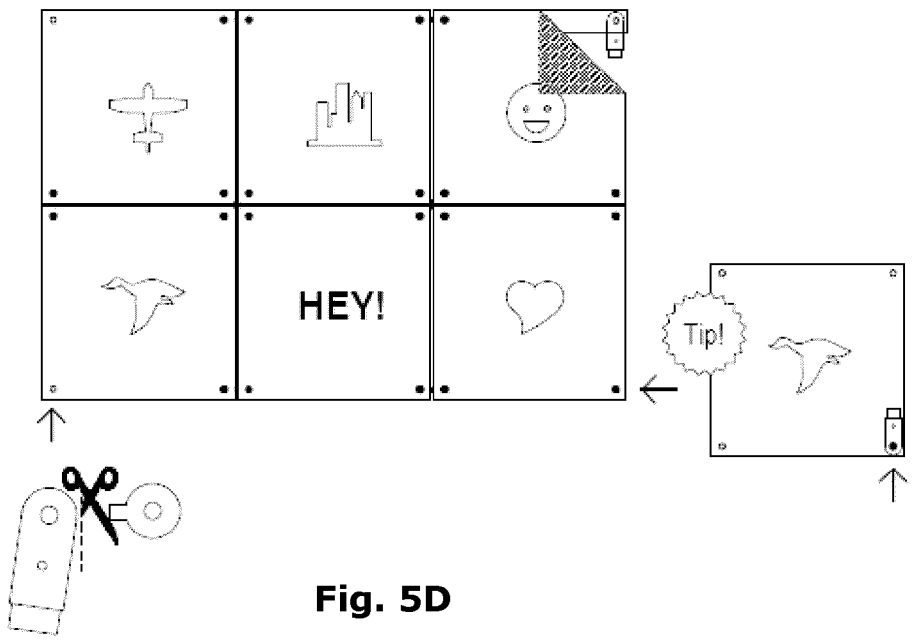
Figure 5E:
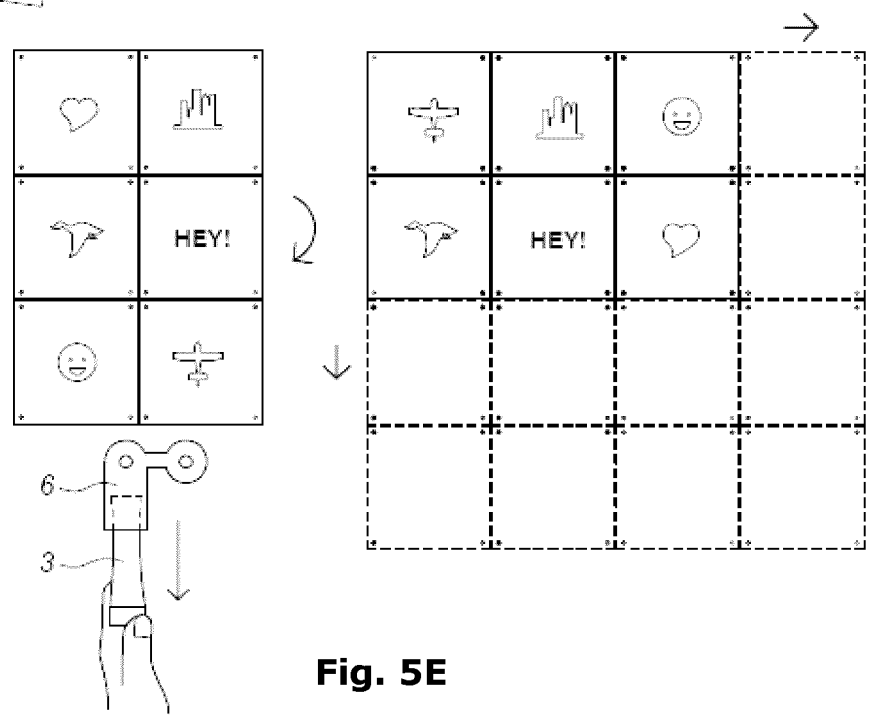

FIGS. 3B and 3C show the most preferred embodiment of the element, whereby the element (6) can be sub-divided in a sub-element (11) and a sub-element (12), by means of a notch (10) present between the two sub-elements. The notch allows easy separation (either by hand or by an aid such as scissors). By preference, a first sub-element (11) will be longer (larger) than the second sub-element (12). Each of the sub-elements is provided with one protrusion (7, 71). Optionally, the connecting element (6) will be provided with a perforation for attaching a pushpin. FIG. 3D shows an embodiment of the connecting element (6) whereby the sub-elements are identical.

The connecting element (6) is provided with at least one protrusion, and preferably two. These protrusions are thus designed to allow connection with the strip perforations and/or perforations on the wall decoration. These protrusions will, at their base (at the level of the body of the element), be provided with a rim. Said diameter at the level of the rim is smaller than the largest diameter of the protrusion or the diameter of a perforation (either on the strip or the wall decoration). This allows good connection of the protrusion to the strip or wall decoration via the perforation.

The connecting element will have a minimal thickness, in order to create a minimal space between wall and strip. By preference, the connecting element will have a thickness smaller than 1 mm, such as between 0.2 and 0.9 mm.

Figure 2B:
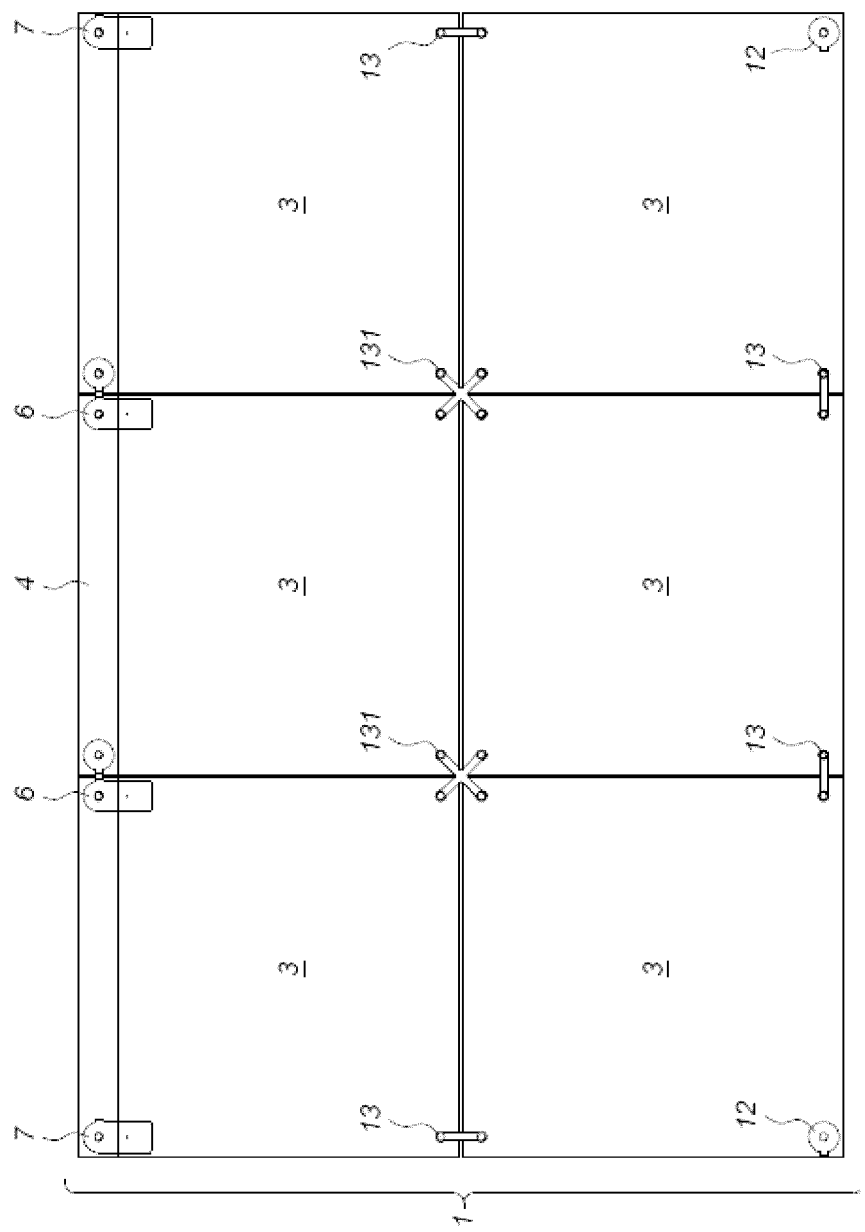
Figure 2C:
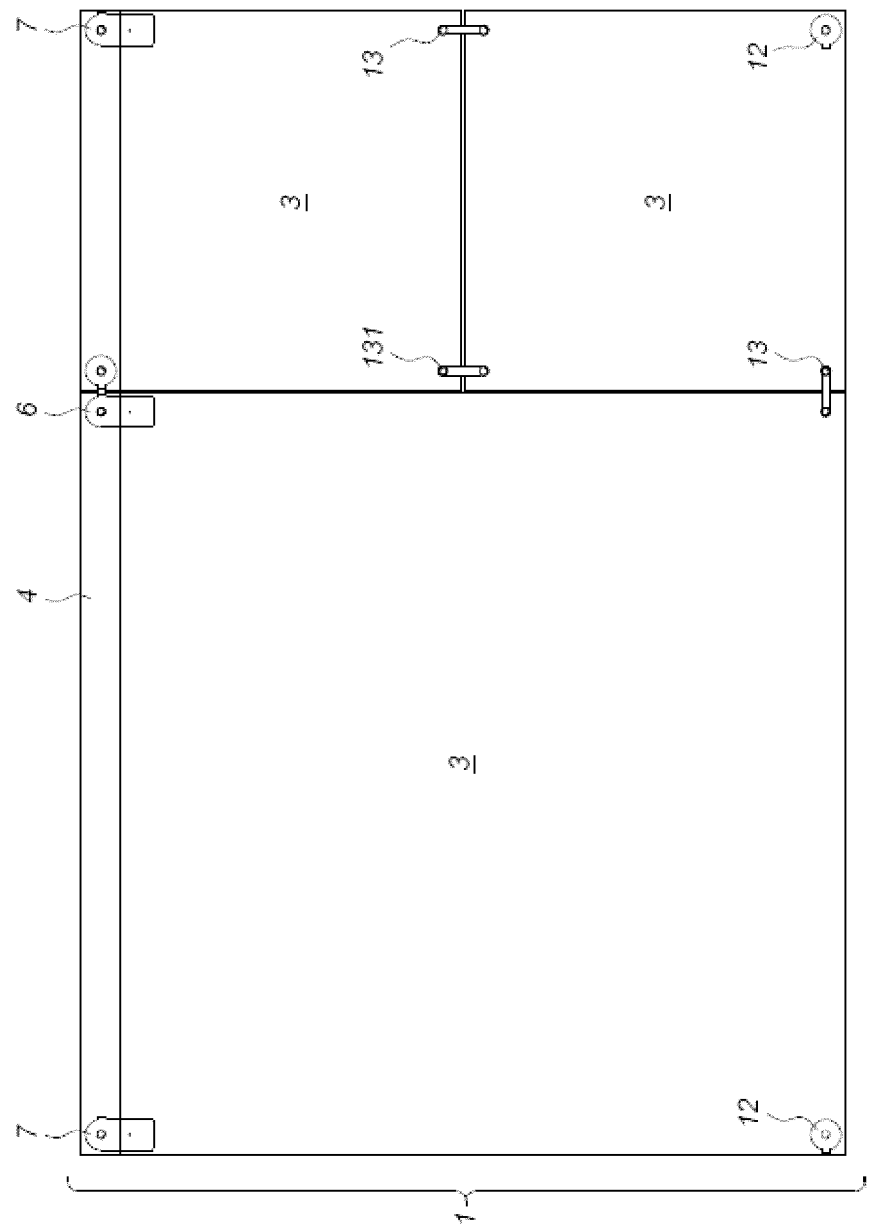

FIGS. 2B and 2C show another embodiment of the wall decoration assembly according to the current invention. Said wall decoration assembly (1) is comprised of a plurality of wall decorations (3), either all having the same dimensions (e.g. square) or having various dimensions (see FIG. 2C where rectangular and square decorations are combined). The wall decorations (3) are provided with a print and can form together one large image, or can have different images, forming a collage.

The top wall decorations are hung to the strip (4) by means of the connecting elements (6) or the sub-elements (7). A non-divided connecting element (6) will be used for the connection of neighboring wall decorations, whereby one protrusion (7) of the element (6) connects to a perforation of a first wall decoration (3) and the second protrusion (71) connects with a perforation on a second wall decoration (3). The wall decorations (3) will subsequently be linked to each other towards one large wall decoration by means of joining elements (13). These joining elements (13) are equally provided with protrusions (14) on their upper surface. Two types of joining elements are hereby used: a type having two protrusions (13) and a type having four protrusions (131). It will be obvious to a skilled person that the type with two protrusions (13) is specifically designed for connecting two wall decorations together, whereas the type with four protrusions (131) allows interconnection of 4 wall decorations (3).

FIG. 4 shows various possible embodiments of the joining elements (13, 131) according to the current invention. FIG. 4A shows a linear type (13) provided with two protrusions (14) at the outer edges. FIG. 4B shows the element (131) with four protrusions (14. FIGS. 4C to 4G all show possible embodiments of a joining element (131) with four protrusions. Similar as for the protrusions present on the connecting element, these protrusions will, at their base (at the level of the body of the element), be provided with a rim. Said diameter at the level of the rim is smaller than the largest diameter of the protrusion or the diameter of a perforation (either on the strip or the wall decoration). This allows good connection of the protrusion to wall decoration via the perforation. The joining elements are by preference made from a plastic or polymer.

It will be appreciated from the embodiments shown in FIG. 2 that the connecting elements (6) all have a maximal length which is larger than the width of the strip, thereby creating a part of the element that extends below the strip.

This extending part (lip) can serve as a lever, allowing easy removal of the assembly or the strip from the wall.

FIG. 5 shows a schematic and stepwise overview of the method according to the current invention.

In a first step, the wall decorations (3) are joined by means of the joining elements (13, 131) according to the current invention. A click aid (15) can be used as an aid, for instance for preventing damage to the wall decorations. If only one wall decoration is used, this step can be omitted.

In a second and third step, the strip will be hung to a wall by means of the connecting elements (6) and/or their sub-elements (11, 12). The adhesive elements (5) are secured to the back of the connecting elements (6) and are subsequently connected to the perforations (8) on the strip (4) which has been cut to a desired length. A ruler and level can be used to ensure correct positioning of the components to the wall.

Part of the connecting elements (6) may be cut along the notch to create sub-elements (step 3). The largest sub-element (11) is placed on the edges of the strip, while the smallest can be connected to the perforations of the left and right outer-corner of the lowermost wall decorations (see step 4).

If desired, a pushpin can be added to the puncture (16) of the connecting elements (6) to allow good and strong connection to the wall (optional step).

In a fourth step, the wall decorations are connected to the strip and the connecting elements, resulting in a perfectly aligned and reusable wall decoration assembly.

To remove or alter the assembly, the wall decorations are taken from the connecting elements (6) and the strip (3) is removed from the wall by means of the extending part (or lip) which acts as lever.

FEATURES

1: wall decoration assembly
2: suspension system
3: wall decoration
4: strip
5: adhesive element
6: connecting element
7, 71: protrusion
8: strip perforation
9: wall decoration perforation
10: notch
11: sub-element
12: sub-element
13, 131: joining element
14: protrusion
15: click aid
16: puncture

What is claimed is:

1. A kit for making a wall decoration assembly, said kit comprises:
a suspension system; and
two or more wall decorations, wherein said two or more wall decorations are each provided with two or more perforations located at or nearby an edge of said wall decoration, and wherein said two or more wall decorations can be hung to a wall by means of said suspension system, wherein said suspension system comprises:
a flexible longitudinal strip provided with two or more perforations;
one or more joining elements; and
one or more adhesive elements,
wherein said suspension system further comprises one or more connecting elements, whereby said connecting element is suitable for receiving said one or more adhesive elements on the rear of said connecting element, and wherein said connecting element comprises at least one protrusion on the front of said connecting element, connectable to one of said perforations of said flexible longitudinal strip and/or of said wall decoration.

2. Kit according to claim 1, wherein said connecting element comprises at least two protrusions.

3. Kit according to claim 1, wherein said connecting element comprises a notch along a longitudinal axis of said connecting element, wherein said notch allows the division of said element into two sub-elements.

4. Kit according to claim 3, wherein each said sub-element is provided with one of said at least one protrusion.

5. Kit according to claim 1, wherein said wall decoration is rectangular and has four of said two or more perforations, whereby each corner of said wall decoration comprises one of said four perforations.

6. Kit according to claim 1, wherein said joining elements are for interconnecting said wall decorations.

7. Kit according to claim 6, wherein said joining elements comprise at least two protrusions on a surface, suitable for engaging with said perforations on said wall decorations.

8. Kit according to claim 6, wherein each said joining element is linear, cross-shaped, round, H-shaped, Z-shaped or U-shaped.

9. Kit according to claim 1, wherein said two or more perforations of said flexible longitudinal strip are located along a longitudinal axis of said flexible longitudinal strip and wherein said flexible longitudinal strip comprises at least one of said two or more perforations at each of the margins of said flexible longitudinal strip, and optionally comprises more of said two or more perforations, which are grouped in pairs and distributed over regular distances along the longitudinal axis of said strip.

10. Kit according to claim 9, wherein the maximal distance between two adjacent ones of said perforations of said flexible longitudinal strip equals the distance between two of said perforations present on one edge of said wall decoration.

11. A wall decoration assembly comprising a suspension system and two or more wall decorations, wherein said wall decorations are each provided with at least two perforations located at or nearby an edge of said wall decoration through which two or more of said wall decorations are removably interconnected by means of joining elements each comprising two or more protrusions, wherein said wall decoration assembly is hung aligned to said wall by means of said suspension system, and wherein said suspension system comprises a flexible longitudinal strip, and wherein said flexible longitudinal strip comprises at least two perforations wherein said suspension system further comprises at least two connecting elements, removably coupled to said wall by adhesive means and wherein said connecting elements are detachably connected to said flexible longitudinal strip and/or one or more of said wall decorations by means of one or more protrusions, and connected to one or more of said perforations present on said flexible longitudinal strip and/or on said two or more wall decorations.

12. Wall decoration assembly according to claim 11, wherein said two or more protrusions of said joining elements are removably engaged to said perforations on said wall decorations.

13. Wall decoration assembly according to claim 11, wherein said wall decoration is rectangular and has four of said at least two perforations, wherein each corner of said wall decoration comprises one of said four perforations.

14. Wall decoration assembly according to claim 11, wherein each said joining element is linear, cross-shaped, round, H-shaped, Z-shaped or U-shaped.

15. Wall decoration assembly according to claim 11, wherein each protrusion on a joining element is connected to one of said perforations of a different one of said wall decorations.

* * * * *

UNITED STATES PATENT AND TRADEMARK OFFICE
CERTIFICATE OF CORRECTION

PATENT NO. : 9,532,670 B2  
APPLICATION NO. : 14/840532  
DATED : January 3, 2017  
INVENTOR(S) : Roel Antonius Wilhelmus Vaessen et al.

It is certified that error appears in the above-identified patent and that said Letters Patent is hereby corrected as shown below:

On the Title Page

Item (73), (Assignee) at Line 2, Change "'s-Hertongenbosch" to --'s-Hertogenbosch--.

Signed and Sealed this  
Twenty-seventh Day of March, 2018

Andrei Iancu  
*Director of the United States Patent and Trademark Office*